Dec. 14, 1965   R. T. PETERSON   3,222,949
CONTROL MECHANISM
Original Filed March 25, 1963                2 Sheets-Sheet 1

INVENTOR.
RONALD T. PETERSON
BY

Dec. 14, 1965  R. T. PETERSON  3,222,949
CONTROL MECHANISM

Original Filed March 25, 1963  2 Sheets-Sheet 2

INVENTOR.
RONALD T. PETERSON

BY

United States Patent Office 3,222,949
Patented Dec. 14, 1965

3,222,949
CONTROL MECHANISM
Ronald T. Peterson, 1141 Denker, Wichita, Kans.
Original application Mar. 25, 1963, Ser. No. 267,626.
Divided and this application Jan. 29, 1964, Ser. No. 345,830
8 Claims. (Cl. 74—471)

This is a division of co-pending application Serial No. 267,626 filed March 25, 1963 for "Control Mechanism."

This invention relates to control mechanisms and while having various applications and uses is especially suitable for use in vehicles including aircraft.

An object of this invention is the provision of a novel control mechanism for actuating and controlling two functions in a prescribed sequence and prohibiting the simultaneous actuation of the two functions or changing the prescribed sequences.

Another object of this invention is the provision of a novel control lever mechanism having one control lever adapted for positively actuating and controlling two functions in a given sequence without danger of the two functions being actuated out of sequence.

A further object of this invention is the provision of a novel control lever mechanism having one manually operated lever for mechanically actuating and controlling two separate control systems in a given sequence wherein one system is locked out while the other system is being operated, and wherein the other system is locked out while the one system is being operated.

A still further object of this invention is the provision of a novel control lever mechanism having one control lever mechanically controlling two control systems in a given sequence, the lever being movable in one direction from a neutral position to operate a first control system and wherein the lever must be returned to the neutral position and thus returning the first control system to its initial condition, before the lever can be moved in another direction from its neutral position to operate a second control system, and wherein the lever must be returned to the neutral position and thus returning the second control system to its initial condition before the lever can again be moved in the one direction.

A still further object of the invention is the provision of a novel control lever mechanism performing the functions normally performed by two separate levers in such a manner that the two functions cannot be carried out simultaneously, one function always being locked out while the other function is being carried out.

Yet another object of this invention is the provision of control lever means for controlling two independent parts of an airplane having a fuselage, a variable sweep airfoil, such as a wing, and a control surface, such as a flap on the wing, wherein the wing sweep can be changed only when the flap is retracted; wherein the flap can be repositioned only when the wing is extended.

A further object of this invention is the provision of means for controlling two independent parts of an airplane having a variable sweep airfoil and a control surface, wherein the positions of the airfoil and control surface can be changed one at a time, but not simultaneously.

The invention further resides in certain novel features of construction, combinations, and arrangements of parts, and further objects and advantages of this invention will be apparent to those skilled in the art to which it pertains from the following description of the present preferred embodiment thereof described with reference to the accompanying drawings, which form a part of this specification, and wherein the same reference characters represent corresponding parts throughout the several views, and in which.

Figure 1:
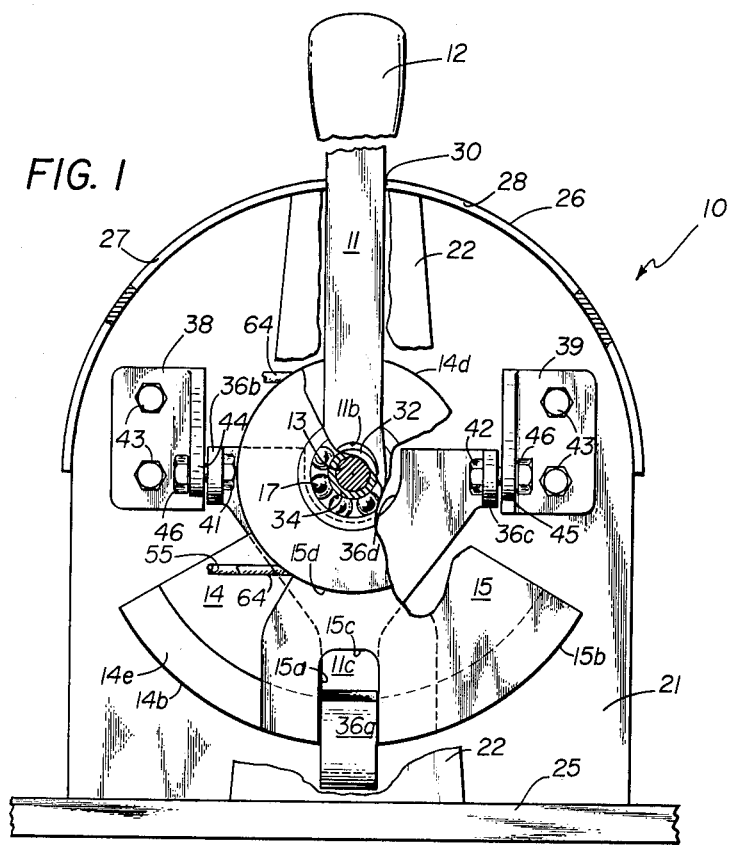
FIG. 1 is an elevational view of a mechanism embodying the invention, with parts broken away and in section to better illustrate the structure thereof.

It is to be understood that the invention is not limited to the details of construction and arrangements of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, an aircraft wing sweep and flap control mechanism embodying the invention, is indicated generally by the reference numeral 10. The invention 10 comprises a control lever 11 having a molded plastic handle grip 12 fixed to the upper and outer end thereof. The lever 11 is preferably pivotally connected near but below its center to a transversely extending turnable journal bolt 13. The lever 11 is disposed between two wire pulley and sector units 14 and 15 journalled on the bolt 13 by means of conventional ball bearing assemblies 16 and 17, respectively. The ends 18 and 20 of the bolt 13 are respectively journalled in a back support member 21 and a front support member 22 by means of conventional ball bearing assemblies 23 and 24, respectively. The support members 21, 22 are suitably connected to a base plate 25. An arcuate or semicircular cover plate 26 is connected to correspondingly-shaped semicircular upper ends of the support members 21, 22.

Arcuate slide guide slots 27 and 28 are centrally formed in the cover plate 26 to guide the movement of the control lever 11 therealong. The two slots 27, 28 are parallel and are coextensive for a distance only slightly greater than the width of the lever 11 at a centrally located cross-over point or gate 30, FIGS. 1 and 2.

The lever 11 is connected to the center of the bolt 13 by means of a fore and aft extending bolt 31. The bolt 31 is secured with a nut 29. The bolt 31 slidably extends through a spacer bushing 32 and through a central opening in the journal bolt 13. The lever 11 has a thickened portion 11a formed with an elongated oval opening 11b therein through which the journal bolt 13 extends. The opening 11b preferably has parallel sides with semicircular ends. The sides of the opening 11b are long enough to permit the upper end of the lever 11 to be freely tilted to the left or right, FIG. 3, in such a manner that its lower end 11c can respectively enter and latch into rectangular slots 15a or 14a. The slots 15a and 14a are respectively formed in arcuate peripheries 15b, 14b of the pulley units 15 and 14, respectively. The purpose of this feature will be described in detail later. The spacer bushing 32 encircling the bolt 13, spaces the roller bearings 16 and 17 apart, FIG. 3. A pair of spacer bushings 33 and 34 encircle the bolt 13 at laterally spaced points and respectively space the roller bearings 23, 16 and 17, 24 apart. A nut 35, FIG. 3, is threaded onto the outer end of the journal bolt 13.

Figure 3:
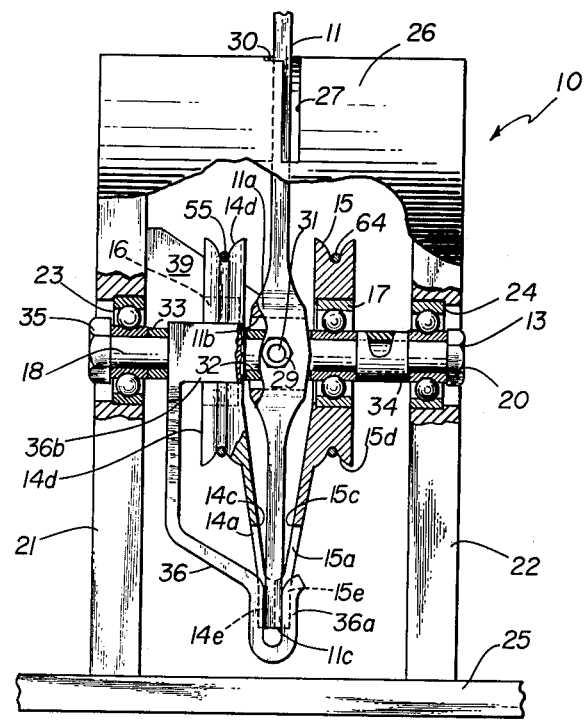
FIG. 3 is an end view of FIG. 1 but with parts broken away and in cross section for showing details of a pulley and quadrant unit journalled on each side of the control lever.

The maximum amount by which the lower level end 11c can be laterally tilted, FIG. 3, is governed by the location of inside edges 14c and 15c in the bottom of the slots 14a, 15a relative to the end 11c of the lever 11. The units 14, 15 each have a pulley portion 14d, 15d suitable for transmitting motion to a wire, cable, tape or the like. However, inwardly inclined or canted sectors of a circle forming the depending segments 14b, 15b are integrally connected to a lower inside surface portion of the pulleys 14, 15, respectively. The lower arcuate edges of the segments 14b, 15b have arcuate bearing pads or shoulders 14e, 15e integrally connected thereto. The pads 14e, 15e are in sliding and guiding contact with each other throughout the full push and pull pivotal movement of the lever 11. The length of the slots 27, 28 controls the maximum swing of the lever 11 and thereby limits the angular displacement of each pulley 14, 15.

The lower end 11c of the lever 11 is adapted to tilt a yoke-shaped latching gate 36 into interlocking engagement within either the slot 14a or 15a depending upon whether the lever 11 is tilted laterally into the wing sweep control slot 28 or into the flap control slot 27 when the lever 11 is respectively in the left or right side of the gate 30, FIG. 3. The lever end 11c at that time is disposed between the sides of a combination gate and latch portion 36a. The portion 36a comprises an upwardly opening fishhook-shaped lever guide gate and a pulley sector unit latch portion. The latching gate 36 can only be laterally tilted or pivoted about a longitudinal axis by the lever end 11c and cannot be angularly displaced the same as the pulleys 14, 15. The latching gate 36a has a yoke-shaped upper end with parallelly extending bracket arms 36b, 36c. The arms 36b, 36c are respectively turnably or tiltably connected to laterally spaced latch plate support brackets 38, 39 by means of bolts 41, 42, FIG. 1. The brackets 38, 39 are oppositely disposed and are made of right angle iron. Bolts 43 are used to bolt one leg of each bracket 38, 39 flush against the elevational face of the rear vertical support 21. The latching gate support bolts 41, 42 are respectively journalled in vertically extending, parallel legs of the support brackets 38, 39 by means of conventional ball bearings 44, 45. The bearings 44, 45 are mounted in the legs of the brackets 38, 39, along an axis coincidental with the tilt axis of the lever 11 and its pivot bolt 31. The tilt axis of the lever 11 is coplanar with the lever swing axis defined by the bolt 13.

The latching gate journal bolts 41, 42 are respectively secured by lock nuts 46. The latching gate yoke has a central slot forming an inverted central archway 36d sufficiently large to admit the journal bolt 13 and the spacer 33 therethrough and also provide for any additional clearance needed for tilting the gate 36 in a clockwise direction as viewed in FIG. 3. Moreover, the arms 36b, 36c are spaced far enough apart, FIG. 1, as to not interfere with the operation of the pulley 14 therebetween.

When the lever 11 is in the cross-over gate 30, FIG. 1, it is prevented from being pivotally swung in a push or pull direction by the cover plate 26. At the same time, the lever end 11c is blocked from movement because the latching gate's hook-end portion 36a is latched into both of the slots 14a, 15a of the pulley units 14, 15. Therefore, since the pulley units 14, 15 are locked into place, the lever end 11c is locked in place.

The lever 11 can be moved to actuate either the flaps or the wings by turning the pulleys 14 or 15, once the lever end 11c is fully engaged within either the slot 14a or the slot 15a by contacting the edges 14c or 15c, respectively. This depends upon whether the lever 11 is moved into the flap control slot 27 or the wing sweep control slot 28. The lever 11 laterally tilts the latch gate 36a and aligns the guide slot of the gate portion 36a with either the pulley 14 or 15 so as to allow the segment to pass through the slot of the gate portion 36a. Assuming the lever end 11c is in the pulley slot 15a, the slot of the gate portion 36a is aligned with the pulley 15 and allows the sector of the pulley 15 to pass therethrough. At the same time one leg of the gate 36a latches into the pulley slot 14a and prevents the pulley 14 from being turned while the pulley 15 is being turned by the lever 11. Similarly, when the lever end 11c aligns the gate 36a with the pulley segment 14b to allow the pulley 14 to be turned by the lever 11, the gate 36a latches into the pulley 15 holding it against turning. The latch gate 36 cannot be turned when the lever 11 is moved along the length of the flap and wing sweep control slots 27, 28. However, the latching gate can be tilted by the lever 11 when the lever 11 is laterally shifted from one side to the other through the gate 30, FIG. 2.

The sectors of the pulleys 14, 15 are identical but oppositely disposed. The arcuate lengths of the rims 14b, 15b depend on the total relative angular displacement of the pulleys 14, 15 since it is desired that the pad portions 14e, 15e thereof be long enough to provide adequate mutual support and guide surfaces throughout the total movement of the lever 11. This is considered desirable so that the ends of the pulley pads 14e, 15e do not extend past each other wherein slight misalignment of the pads 14e, 15e could result in random overlap. This could cause the pulley being actuated to hang up and jam the control lever 11. The arcuate length of the flap and wing sweep control slots 27, 28 controls the total angular displacement of the pulleys 14, 15.

Although not shown, suitable known means can be provided, if desired, for braking or holding the lever or the journal bolt 13 in place along the slots 27, 28 when the flaps and wing sweep are selectively positioned between fully extended and fully retracted positions.

Figure 4:
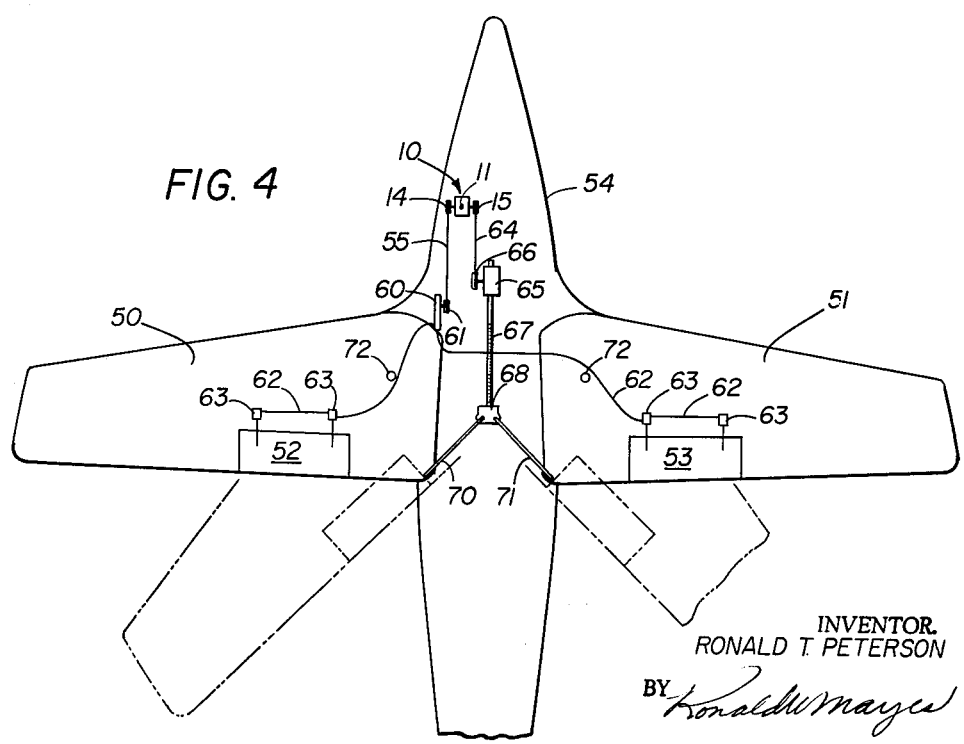
FIG. 4 is a schematic layout illustrating a best mode of the invention wherein aircraft wing sweep and wing flaps are sequentially controlled.

Although the lever mechanism 10 can be used in various embodiments, combinations and environments, the mechanism 10 is particularly useful in an aircraft to respectively control the sweep of wings 50, 51 and flaps 52, 53 thereof, FIG. 4. The roots of the wings 50, 51 are pivotally supported within the confines of an aircraft fuselage 54. When the wings 50, 51 are retracted by moving the lever 11 forward in the wing sweep slot 28, FIG. 2, the flaps 52, 53 become partially housed within the confines of the fuselage 54. This is shown in hidden outline in FIG. 4. In order to accomplish this maneuver of sweeping back the wings 50, 51 it is desirable to have the flaps fully retracted so that the flaps will not aerodynamically interfere with the flight of the airplane and the function of the wings 50, 51. In addition, means forming openings of suitable configuration and dimension, not shown, are provided in the fuselage 54 for accommodating part of the wings 50, 51 and flaps 52, 53 without interference. Interference would occur if the flaps were not retracted.

The wings 50, 51 are preferably fully extended on take-off and landing, as shown in FIG. 4, to enhance the lift and drag characteristics thereof. Moreover, it is desirable on take-off and landing to extend the flaps 52, 53 to further add to the increased aerodynamic lift and drag characteristics of the extended wings 50, 51.

Figure 2:
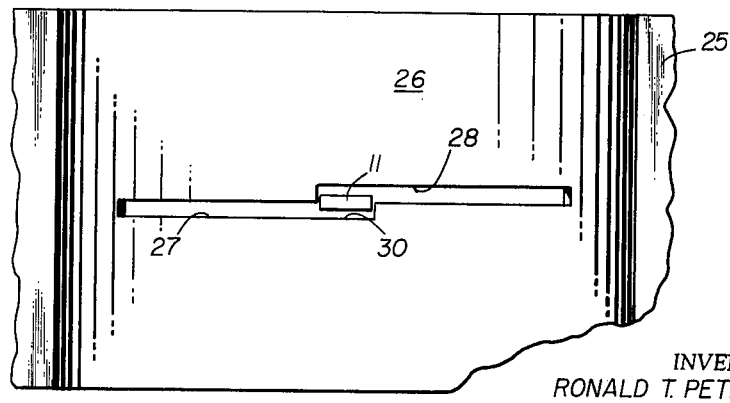
FIG. 2 is a top plan view of FIG. 1 showing a cover plate having a guiding gate in which a control lever is moved, a handle grip of the lever being removed for a better view of the gate.

The flaps 52, 53 are extended downwardly by moving the lever 11 rearwardly in the extend flaps slot 27, FIG. 2. This movement of the lever 11 turns the pulley 14 in a counter clockwise direction, FIG. 1, and causes a wire cable 55 to actuate flap actuator means 60 for operating the flaps 52, 53. The flap actuator means 60 are controlled by a pulley 61 that is driven by the cable 55. The flap actuator means 60 control the flow of fluid to hydraulic lines 62 leading to double acting fluid motors 63 for extending and retracting the flaps 52, 53.

After the lever 11, FIG. 2, has its lower end 11c moved through the gate 36 and has its upper end moved into the retract wing slot 28, the pulley 15 is moved clockwise, FIG. 1. The pulley 15, FIG. 1, drives its cable 64 clockwise and actuates a wing sweep actuator means 65 via a cable pulley 66. The wing sweep actuator means turn a differential screw means 67. As the screw means 67 are turned, a nonrotatable nut 68 travels along the screw means 67 and extends or retracts the wings 50, 51 respectively by push-pull rods 70, 71. The rods 70, 71 have inner ends pivotally connected to the traveling nut 68 and have outer ends pivotally connected to inboard trailing ends of the wings 50, 51, respectively. The wings 50, 51 are fixed to pivot pins 72, FIG. 4. As the nut 68 travels forwardly on the screw means 67, the wings 50, 51 are retracted. As the nut 68 is driven rearwardly on the screw means 67, the wings 50, 51 are extended.

It is recognized that the pulleys 14, 15 can carry or be replaced with other known control elements, such as levers having push-pull rods, limit switches, field rheostats and/or other means for responding to the movement of the lever 11.

It will be understood that the present invention may be modified to adapt it to various circumstances and conditions, and it is accordingly desired to comprehend within the purview of this invention such modifications as may be considered to fall within the scope of the appended claims.

What is claimed, is:

1. A control lever mechanism comprising: a frame, a control lever mounted in said frame for pivotal movement fore and aft about a transverse axis and for lateral movement about a longitudinal axis from a neutral position, two control elements for attachment to separate controls, said control elements being pivotable about said transverse axis of said control lever, interlocking means interlocked with both of said control elements and pivotable only about said longitudinal axis, said interlocking means being tilted by said control lever with lateral movement of said control lever from said neutral position in such a manner that said interlocking means remains interlocked with one of said control elements and simultaneously disengages and unlocks the other of said control elements and permits it to be turned about said transverse axis by said control lever, and said control lever engaging the other of said control elements and controlling position of the same.

2. A control mechanism comprising, a frame, control lever means mounted in said frame for pivotal movement fore and aft about a transverse axis and for being laterally tilted about a longitudinal axis from a neutral position, two control elements for attachment to separate controls, said control elements being pivotable by said control lever means in a fore and aft direction, interlocking means interlocked with said control elements and adapted to be laterally tilted by said control lever means, said interlocking means being laterally tilted by said control lever means with lateral movement of said control lever from said neutral position in such a manner that said interlocking means remains interlocked with one of said control elements and is disengaged from and unlocks the other of said control elements when said control lever means is engaged with the same said other control element, pivotal movement of said control lever about its fore-aft axis pivots said unlocked control element in the fore and aft direction, and said one of said control elements is held against pivotal movement.

3. A control lever mechanism comprising, a frame, control lever means carried by said frame pivotable about a transverse axis and a longitudinal axis, first driven means, second driven means, and interlocking means carried by said frame interlocked with said first and second driven means and pivotable about said longitudinal axis, and said interlocking means being tilted by said control lever means with lateral movement of said control lever means from a neutral position in such a manner that said interlocking means remain interlocked with one of said driven means and disengages and unlocks the other of said driven means for permitting the same to be driven by said control lever means for controlling the position of the same.

4. A control mechanism comprising, a frame, a shaft journaled in said frame and pivotal about a transverse axis, a first pulley and a second pulley parallelly journaled on said shaft, said first pulley having a downwardly extending first sector portion with a slot formed in a midportion of an arcuate periphery thereof, said second pulley having a downwardly extending second sector portion with a slot formed in a midportion of an arcuate periphery thereof, a control lever disposed about said shaft at a midportion thereof and between said first pulley and said second pulley, a pin extending through said shaft and said control lever in a longitudinal direction for causing said control lever and said shaft to pivot in unison about said transverse axis and permitting said control lever to be laterally displaced about a longitudinal axis for engaging either of said first and second pulleys when moved into either of said pulley sector slots, yoke-shaped interlocking means pivotally connected to said frame for pivotal movement about a longitudinal axis coplanar with said transverse axis and straddling said shaft and said control lever at a midportion thereof, said interlocking means having a depending channel-shaped latching gate with parallel walls of said latching gate entered in said slots of said first and second pulley sector portions for locking said first and second pulleys against pivotal movement on said shaft, and said control lever having an upwardly extending portion adapted to be grasped by an operator and having a downwardly extending portion adapted to enter either of said slots of said first and second pulley sector portions and bear against said latching gate for tilting said interlocking means and freeing one of said pulleys from said latching gate portion for movement with said control lever, the walls of said latching gate portion being spaced apart sufficiently to permit the passage of the lower tip of the downwardly extending portion of said control lever to pass therebetween when in a neutral position, and a guide plate connected to said frame having parallel noncoextensive guide slots formed therein for guiding said upwardly extending portion of said control lever in such a manner that one of said pulleys can be angularly displaced in one direction a given increment and returned to neutral independently of the other of said pulleys that remains locked in the neutral position and then the other of said pulleys can be engaged by laterally tilting said control lever in an opposite direction into the other of said guide slots and the other of said pulleys can be engaged and angularly displaced in an opposite direction a given increment independently of the one of said pulleys that is locked in the neutral position until said control lever is returned to neutral position and shifted back to the one of said slots.

5. A control mechanism comprising, a frame, a shaft journaled in said frame, a first pulley and a second pulley parallelly journaled on said shaft, said first pulley having a downwardly extending first sector portion with a slot formed in a midportion of an arcuate periphery thereof, said second pulley having a downwardly extending second sector portion with a slot formed in a midportion of an arcuate periphery thereof, a control lever disposed about said shaft at a midportion thereof and between said first pulley and said second pulley, a pin extending through said shaft and said control lever in a longitudinal direction for causing said control lever and said shaft to pivot in unison and permitting said control lever to be laterally displaced for engaging either of said first and second pulleys when moved into either of said pulley sector slots, yoke-shaped interlocking means pivotally connected to said frame for pivotal movement about a longitudinal axis coplanar with a transverse axis of said shaft and straddling said shaft and said control lever at a midportion thereof, said interlocking means having a depending channel-shaped latching gate with the walls of said latching gate entered in said slots of said first and second pulley sector portions for locking said first and second pulleys against pivotal movement on said shaft, and said control lever having an upwardly extending portion adapted to be grasped by an operator and having a downwardly extending portion adapted to enter either of said slots of said first and second pulley sector portions and bear against said latching gate for tilting said interlocking means and freeing one of said pulleys from said latching gate portion for movement with said control lever, and a guide plate connected to said frame and having guide slots formed therein for guiding the movement of said control lever.

6. A control mechanism comprising, a frame, a shaft pivotally mounted in said frame, a first pulley and a second pulley pivotally mounted on said shaft, said first pulley having a downwardly extending portion with a slot formed therein, said second pulley having a downwardly extending portion with a slot formed therein, a control lever disposed about said shaft and between said first pulley and said second pulley, a pin extending through said shaft and said control lever in a longitudinal direction for causing said control lever and said shaft to pivot in unison and permitting said control lever to be laterally displaced for engaging either of said first and second pulleys when moved into either of said pulley slots, and yoke-shaped interlocking means pivotally connected to said frame for pivotal movement about a longitudinal axis, said interlocking means having a depending latching gate entered in said slots of said first and second pulley portions for locking said first and second pulleys against pivotal movement on said shaft, and said control lever having an upwardly extending portion adapted to be grasped by an operator and having a downwardly extending portion adapted to enter either of said slots of said first and second pulley portions and bear against said latching gate for tilting said interlocking means and freeing one of said pulleys for movement with said control lever.

7. A control mechanism comprising, a frame, a shaft pivotally mounted in said frame, a first means and a second means journaled on said shaft, said first means having a downwardly extending portion with a slot formed therein, said second means having a downwardly extending portion with a slot formed therein, control means disposed about said shaft and between said first and second means, a pin extending through said shaft and said control means for causing said control means and said shaft to pivot in unison and permitting said control means to be laterally displaced for engaging either of said first and second means when moved into either of said slots, and interlocking means pivotally connected to said frame and having a depending latching gate entered in said slots of said first and second means for locking said first and second means against pivotal movement on said shaft, and said control means having a downwardly extending portion adapted to enter either of said slots of said first and second means and bear against said latching gate for tilting said interlocking means and freeing one of said first and second means for movement with said control means.

8. A control lever mechanism comprising, a frame, control means carried by said frame pivotable about a transverse axis and a longitudinal axis, first driven means, second driven means, and interlocking means pivotally connected to said frame and tiltable by said control means with lateral movement of said control means from a neutral position in such a manner that said interlocking means remains interlocked with one of said driven means and disengages and unlocks the other of said driven means for permitting the same to be driven by said control means for controlling the position of the same.

References Cited by the Examiner
UNITED STATES PATENTS

| | | | |
|---|---|---|---|
| 1,736,330 | 11/1929 | Schmidt | 74—483 X |
| 2,691,080 | 10/1954 | Kellogg | 74—471 X |
| 3,122,941 | 3/1964 | Goldsmith | 74—471 X |

MILTON KAUFMAN, *Primary Examiner.*

BROUGHTON G. DURHAM, *Examiner.*